United States Patent [19] [11] 3,876,196
Naggert [45] Apr. 8, 1975

[54] SUPPORT WITH RETRACTABLE STOP
[75] Inventor: Dietrich K. Naggert, Calumet, Ill.
[73] Assignee: Continental Can Company, Inc., New York, N.Y.
[22] Filed: Sept. 25, 1973
[21] Appl. No.: 400,500

Related U.S. Application Data
[62] Division of Ser. No. 298,420, Oct. 17, 1972, which is a division of Ser. No. 117,305, Feb. 22, 1971, Pat. No. 3,717,971.

[52] U.S. Cl. .............................. 269/304; 269/320
[51] Int. Cl. ............................................. B23q 3/18
[58] Field of Search ............ 83/391, 393; 193/35 A, 193/35 G, 35 SS; 214/6 P; 269/10, 25, 303, 304, 291, 297, 298, 299, 315, 316, 317, 318, 319, 320

[56] References Cited
UNITED STATES PATENTS
2,059,010  10/1936  Melin ................................... 83/391
2,769,493  11/1956  Karsoe ............................ 269/316 X
3,088,569  5/1963  McClelland ...................... 193/35 A
3,442,400  5/1969  Roth .................................. 214/6 P Primary Examiner—Granville Y. Custer, Jr.
Assistant Examiner—Mark S. Bicks
Attorney, Agent, or Firm—Diller, Brown, Ramik & Wight

[57] ABSTRACT

This disclosure relates to an adaptation of a conventional vacuum closing machine for closing flexible containers. A flexible container, such as a ham can, is filled with the product and delivered to the closing machine. The container, together with a closure therefor, are separately moved into the interior of the closing machine and are separately supported therein. Thereafter, mechanism is actuated to move a vacuum pot into a sealed position around the container and closure, and the lifting of the closure off of the support therefor by a mold, which mold receives the container and both supports and shapes the container. After a vacuum has been drawn in the pot, the container with the closure sitting thereon is moved by the mold into a seaming position. The machine includes a special stop for positioning a container on the container support and special pusher mechanism for effecting the feeding of containers and closures to the machine and for discharging closed containers from the machine.

11 Claims, 9 Drawing Figures

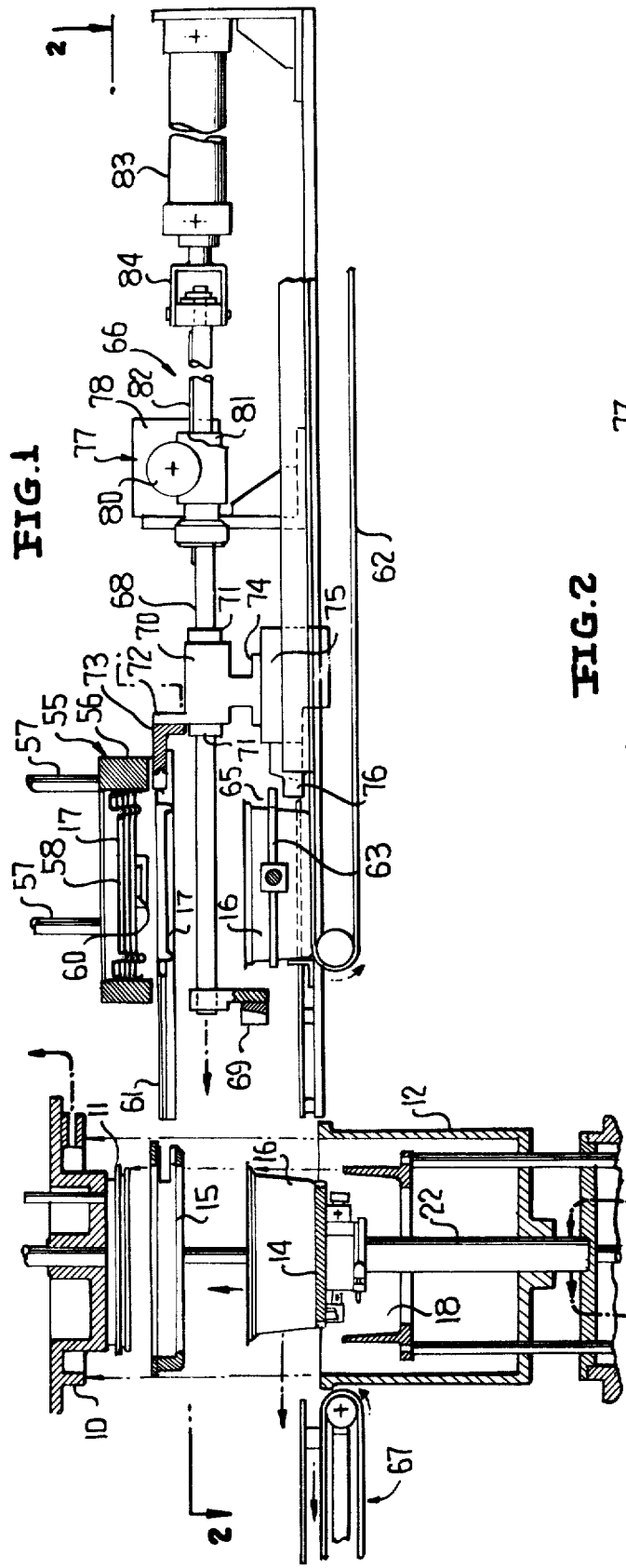
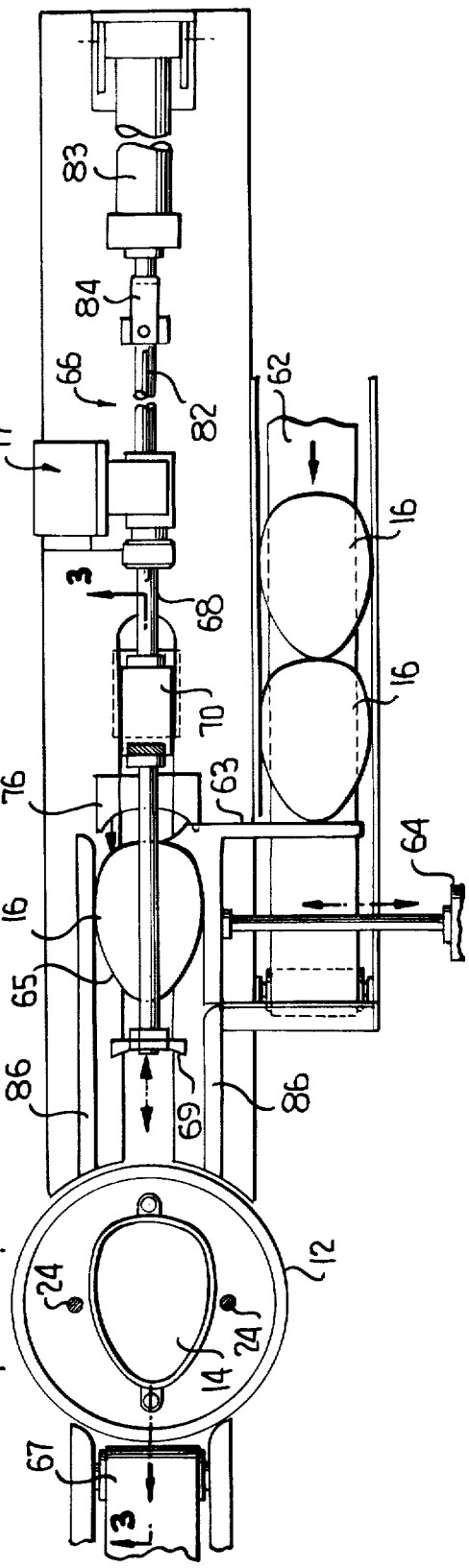

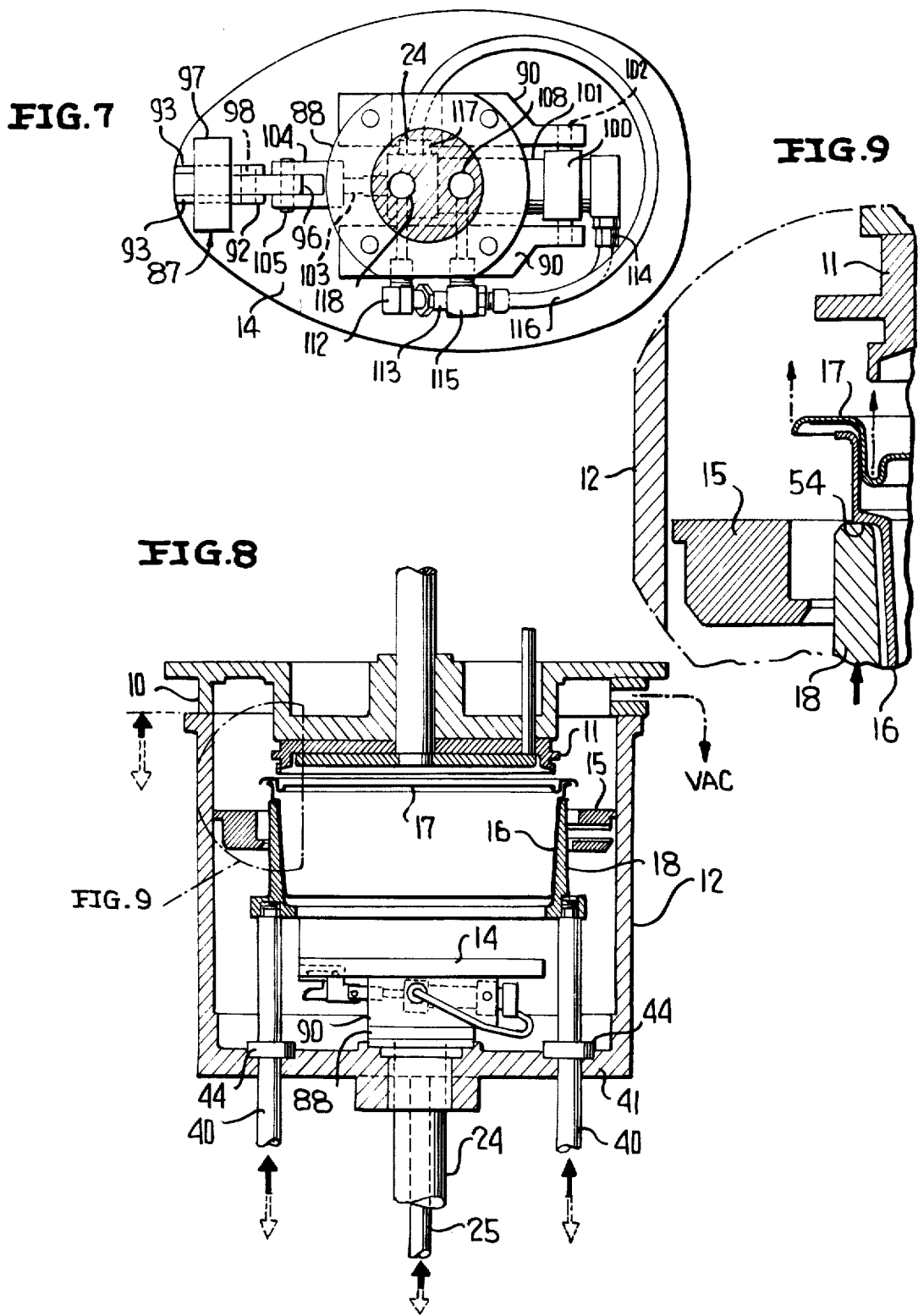

SUPPORT WITH RETRACTABLE STOP

This is a division of Ser. No. 298,420, filed Oct. 17, 1972, which is a division of Ser. No. 117,305, filed Feb. 22, 1971, now U.S. Pat. No. 3,717,971, granted Feb. 27, 1973.

This invention relates in general to new and useful improvements in vacuum closing machines, and more particularly to apparatus for use in conjunction with a conventional type of vacuum closing machine for handling flexible containers, such as plastic ham cans.

BACKGROUND OF THE INVENTION

It is well known to vacuum close containers. This is normally accomplished by simultaneously and independently moving a container and a closure into the interior of a closing machine and separately supporting the container and closure. Thereafter, the container and closure are sealed within a vacuum pot and the vacuum drawn therein, and the container is moved by means of a support to first pick up the closure and then to bring the container and closure into position for closing by means of a conventional seaming head.

When the containers are of a metal construction, they have sufficient rigidity so as to be self-supporting and the support for the containers may be in the form of a simple chuck or other type conventional support. However, when the containers are formed of a flexible material, such as plastic, they cannot, in the first place, withstand the axial thrust of the seaming head. Secondly, quite frequently they are deformed when the product is placed therein. As a result, it is not possible to close flexible containers, such as plastic ham cans, in conventional vacuum closing machines.

SUMMARY OF THE INVENTION

In accordance with this invention, the conventional vacuum closing machine has been modified to incorporate therein a mold of a size to snugly receive therein the flexible container to be closed to thereby assure the conforming of the container to the necessary shape therefor, and to support the upper seam forming portion of the container so that the container may withstand the normal axial pressure applied thereto through the closure therefor during the seaming operation. In accordance with this invention, the mold is of a tubular construction and of a size and configuration so as to telescope over the support for the container, which support is held stationary whereby the container may be freely engaged by the mold for the necessary lifting and supporting thereof for the closing operation.

Another specific feature of this invention is the provision of means for accurately positioning a container on the support therefor with such means being of a nature wherein they in no way interfere with the telescoping of the mold over the container support and the movement of the mold past the container support. This is accomplished by providing a specially shaped pusher which will push a container onto the container support with the desired alignment, and a retractable stop which will cooperate with the pusher to assure the proper positioning of the container in the direction of movement thereof onto the container support.

A further feature of this invention is the specific details of the retractable stop, which stop is normally mounted below the container support and which is movable in a combined sliding and pivotal movement from a retracted position beneath the container support to an upstanding position along one edge of the container support.

Another feature of the retractable stop is the provision of power means for effecting the movement of the retractable stop, the power means being mounted entirely beneath and within the outline of the container support, and the power means further having straight line movement which is converted by the combined pivotal and sliding mounting of the stop into movement of the stop from the fully retracted position thereof to the fully extended position thereof.

A further specific feature of the closing machine is the proivisions of a pusher which will simultaneously and sequentially push a closed container off of the container support to discharge means and in spaced relation to the closed container, push another container onto the container support. The pusher is also adapted to simultaneously push a closure from a stack of closures into the closing machine is overlying relation to the newly positioned container to be closed.

Another specific feature of the pusher is the construction of the pusher to include a shaft mounted for both reciprocatory and rotary movement, and there being carried by the shaft two separate pusher elements, one for engaging a closed container and one for engaging a container to be closed, the shaft being actuatable to sequentially and separately push a closed container from the container support and to push a container to be closed onto the same container support in a single movement of the shaft, and the shaft being rotatable after the closed container has been pushed out of the machine to move the pusher element which engaged the closed container out of the path of movement of the container to be closed without disturbing the relationship between the second pusher and the container to be closed, and thereafter, retracting the pusher element and returning the pusher elements to their original positions.

With the above and other objects in view that will hereinafter appear, the nature of the invention will be more clearly understood by reference to the following detailed description, the appended claims and the several views illustrated in the accompanying drawings:

IN THE DRAWINGS

FIG. 1 is a schematic side elevational view with parts broken away and shown in section of a vacuum closing machine modified in accordance with this invention.

FIG. 2 is a horizontal sectional view with parts shown in plan taken along the line 2—2 of FIG. 1.

FIG. 7 is an enlarged fragmentary horizontal sectional view taken along the line 7—7 of FIG. 3 and shows the details of the retractable stop.

FIG. 8 is a fragmentary sectional view through the closing machine after a vacuum has been drawn therein with the container and closure being moved into engagement with the seaming head.

FIG. 9 is an enlarged vertical sectional view of a portion of FIG. 8 as indicated.

Figure 3:
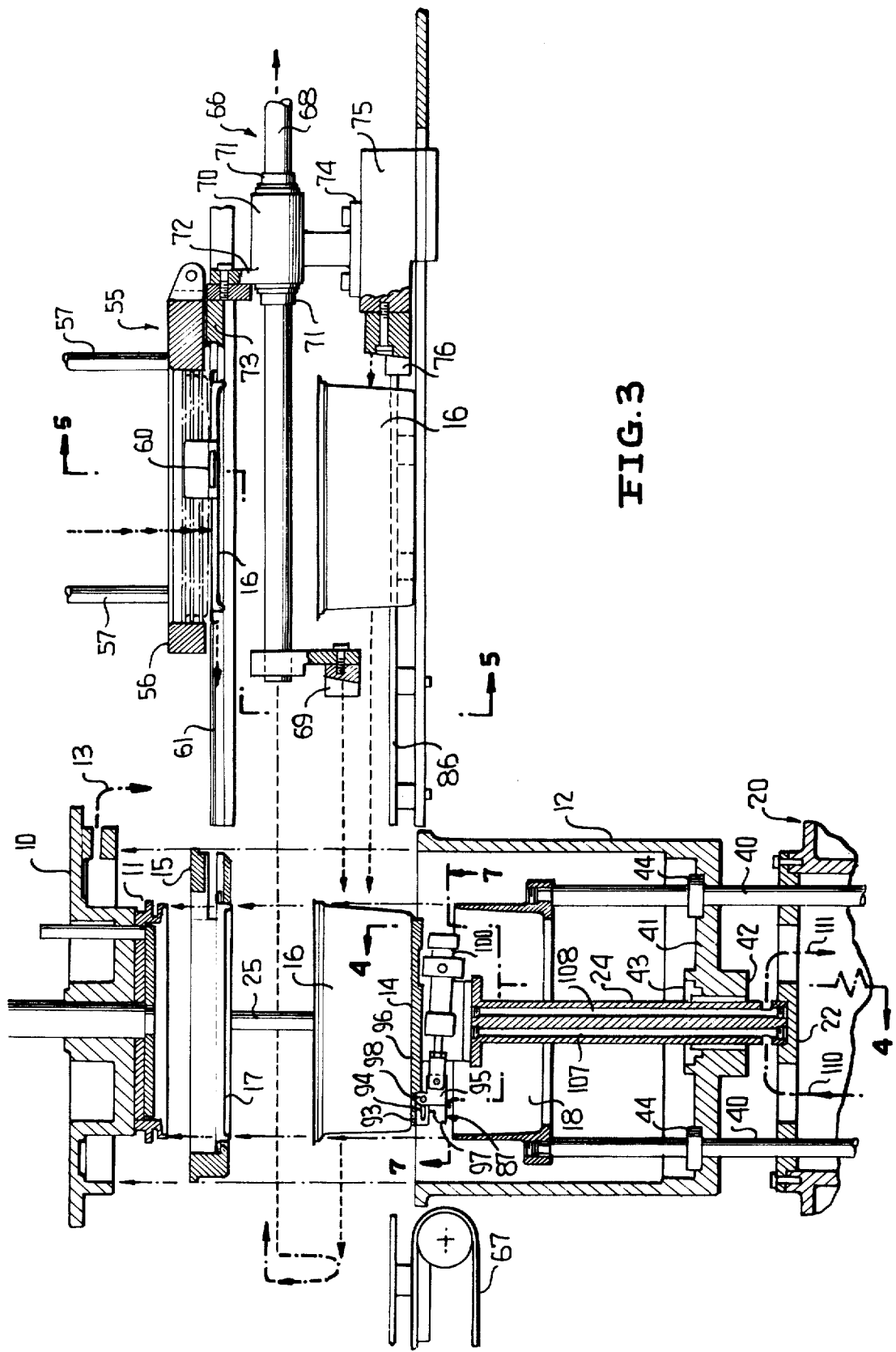
FIG. 3 is an enlarged fragmentary vertical sectional view taken along the line 3—3 of FIG. 2 and shows more specifically the details of the closing machine and the means for pushing containers thereinto and pushing containers therefrom.

This invention relating to improvements in a conventional vacuum closing machine, only such specific details of the conventional closing machine will be described here as is necessary to obtain a full understanding of the structure and operation of the invention. With particular reference to FIG. 3, it will be seen that the closing machine includes a cover 10, which is vertically fixed in any desired manner. Associated with the cover 10 is a conventional seaming head 11 which will not be described in further detail here.

Mounted beneath the cover 10 for vertical reciprocation between a retracted position and an elevated position is a vacuum pot 12. After the pot 12 has been brought into sealed engagement with the underside of the cover 10, a vacuum is automatically drawn in the pot 12 by means of a vacuum line 13.

The customary vacuum closing machine also includes a container support 14 and a closure support 15, the closure support overlying the container support 14. In the operation of the conventional container closing machine, a container, such as the container 16 is positioned on the container support 14 and a closure, such as the closure 17, is positioned in the closure support 15. Then the vacuum pot 12 is moved up into sealed engagement with the cover 10 and the container 16 is lifted by means of the support 14 to first pick up the closure 17 and then to bring the container 16 and the closure 17 into engagement with the seaming head 11 to effect the seaming of the closure 17 to the container 16 and close the container 16.

However, in accordance with this invention, the container support 14 is mounted in a fixed position and a mold 18 is incorporated in the closing machine for lifting the container 16 off of the container support 14 and for supporting the container 16 during the closing thereof. By utilizing the mold 18 and properly configurating the same in conjunction with the container 16, the container 16 may be formed of a flexible material which is not customarily used in the packaging of products such as ham, etc. Specific reference is made to the packaging of hams in plastic cans which are of a generally ham configuration, such as is shown in FIG. 2.

CLOSING MECHANISM

Figure 4:
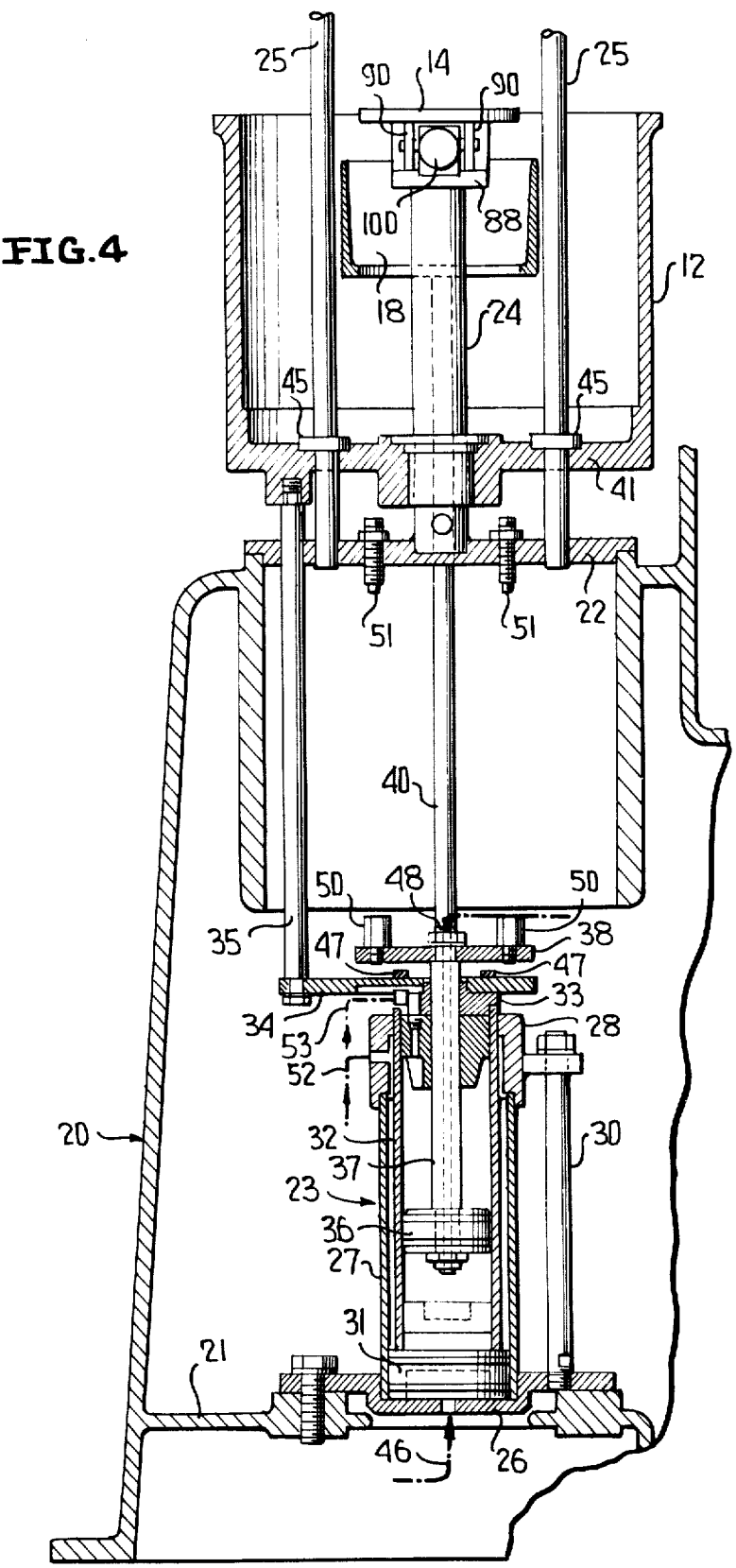
FIG. 4 is an enlarged fragmentary vertical sectional view taken along the line 4—4 of FIG. 3 and shows specifically the details of the support and operating structure of the closing machine.
Figure 5:
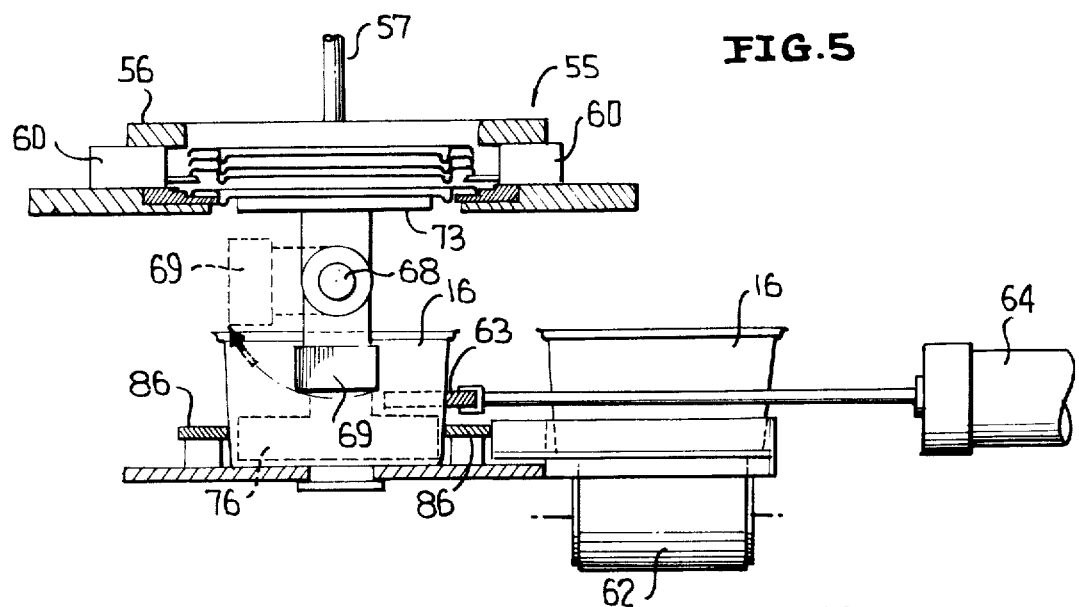
FIG. 5 is a transverse vertical sectional view taken along the line 5—5 of FIG. 3 and shows further the details of the container positioning mechanism.

With particular reference to FIGS. 3 and 4, it will be seen that the closing machine includes a base, which is generally identified by the numeral 20. The base 20 includes a lower support plate 21 and an upper support plate 22. An upright compound expansible fluid motor 23 is carried by the support plate 21. A support shaft 24 is carried by the upper support plate and fixedly supports the container support 14. In addition, guide rods 25 that are affixed to closure support 15 align mold 18 and support plate 22 with the seaming head 11 for accurate seaming position.

The fluid motor 23 includes a base 26 having an outer cylinder 27 extending upwardly therefrom. The outer cylinder 27 is also provided with an upper head 28. If desired, the base 26 and the head 28 may be tied together by suitable tie rods 30.

A first piston 31 is mounted within the lower portion of the cylinder 27 for movement relative thereto. The piston 31, in turn, carries an inner cylinder 32 which is slidable through the head 28 and is sealed relative thereto in a conventional manner. The upper end of the inner cylinder 32 is closed by means of a head 33 to which there is secured a plate 34. The plate 34 has extending upwardly therefrom a plurality of support rods 35 which, in turn, support the pot 12. It will thus be seen that when the piston 31 and the cylinder 32 move upwardly relative to the cylinder 27, the pot 12 will elevated and will in this manner be moved into sealed engagement with the cover 10.

A second piston 36 is carried by the inner cylinder 32 and has a piston rod 37 connected thereto. The piston rod 37 extends out through the head 33 in sealed guided relation and has secured to the upper end thereof a plate 38. The plate 38, in turn, carries a plurality of support rods 40 which, as is best shown in FIG. 3, have their upper ends secured to the mold 18 for effecting the vertical shifting of the mold 18.

At this time it is pointed out that the vacuum pot 12 has a bottom wall 41 through which the support shaft 24 and the support rods 25 and 40 extend. In order that a seal may be obtained with the pot 12, it is necessary that the bottom wall 41 of a sealed construction. To this end, the bottom wall 41 is provided with a central boss 42 through which the support shaft 24 extends and the upper portion of the boss 42 is provided with a seal 43 which engages the shaft 24.

As is also best shown in FIG. 3, the support rods 40 are sealed relative to the bottom wall 41 of the vacuum pot 12 by means of suitable conventional seals 44. With reference to the support rods 25, it will be seen from FIG. 4 that these are sealed relative to the bottom wall 41 of the vacuum pot 12 by means of conventional seals 45.

VACUUM CLOSING OPERATION

With particular reference to FIGS. 3, 4 and 8, after a container 16 has been placed on the container support 14 and a closure 17 has been positioned in the closure support 15, fluid, such as air, may be delivered into the cylinder 27 below the piston 31 through a line 46. This will result in the upward movement of the piston 31 and cylinder 32, which, in turn, will result in the upward movement of the vacuum pot 12.

The piston 31 and the cylinder 32 continue to move upwardly until such time as the vacuum pot 12 is brought into sealed engagement with the underside of the cover 10. After a seal is made, a vacuum is drawn in the vacuum pot 12 through the vacuum line 13.

With particular reference to FIG. 4, it is to be noted that with the upward movement of piston 31 and consequently plate 34 two resilient stops 47 come into engagement with the underside of plate 38 with the result that mold 18 will move upwardly in unison with vacuum pot 12. The mold 18 will pick up the container 16 resting on the container support 14 and move the same upwardly to a position in engagement with or just underlying the closure 17. At this point the mold 18 suddenly stops and seating of the container 16 in the mold is assured.

After the vacuum pot 12 has reached its uppermost position, and the vacuum has been established therein, a fluid under pressure will pass through a port 48 in the piston rod 37 into the cylinder 32 below the piston 36 and the piston 36 will then move upwardly within the cylinder 32 independently of the movement of the cylinder 32 and the piston 31. The further upward movement of the piston 36 will result in further upward movement of the mold 18 with the movement of the mold 18 being such as to assure the movement of the container 16 to a position first to pick up the closure 17 and then to position the container 16 and the closure 17 relative to the seaming head 11 as is necessary to perform the seaming of the closure 17 to the container 16.

With particular reference to FIG. 4, it will be seen that the plate 38 carries a pair of upwardly projecting stops 50. The stops 50 are aligned with downwardly projecting, adjustable stops 51 carried by the plate 22. By properly adjusting the stops 51, the vertical movement of the plate 38 may be stopped in the correct position to position the container 16 and closure 17 relative to the seaming head 11.

After the closing operation has been completed, fluid, such as air, will be directed into the upper ends of the cylinders 27 and 32 through lines 52 and 53, respectively, to simultaneously retract the pistons 31 and 36. Thus, while there is a sequential elevating of the mold 18 and the vacuum pot 12, the mold 18 and the vacuum pot 12 will move downwardly simultaneously.

With particular reference to FIGS. 8 and 9, it will be seen that the mold 18 is configured so as to assure the shaping of the flexible container 16. Furthermore, it will be seen that the upper portion of the container 16 is provided with a shoulder 54 which is engaged by the upper end of the mold 18 so as to support the flexible container 16 along the upper seam forming portion thereof whereby the container 16 is able to withstand the necessary axial pressure imparted thereto by the seaming head 11 in the customary seaming of the closure 17 to the container 16.

It is also to be noted that the relative proportions of the container support 14, the closure support 15 and the mold 18 is such that the mold 18 may be completely telescoped over and past beyond the container support 14. In a like manner, the upper portion of the mold 18 may pass through the closure support 15 and after the closure has been seamed to the container, there is sufficient clearance for the seamed container to return down through the closure support 15 without interference. It is further to be noted that there is sufficient clearance for the vacuum pot 12 to pass up around the closure support 15.

FEED MECHANISM

With particular reference to FIGS. 1 and 2, it will be seen that the closures 17 are supplied by way of a stack with the closure 17 being carried by a suitable support generally identified by the numeral 55. The support 55 includes a base 56 and upstanding guide rods 57. The base 56 is provided with openings 58 through which conventional closure separators 60 project. The closure separators 60 are so constructed whereby they will release one at a time the lowermost closure in the stack of closures. Since these closure separators are conventional and not a part of this invention, further description is believed to be unnecessary.

A closure slide 61 is mounted beneath the base 56 and extends towards the closure support 15. A lower most closure 17 dropped from the stack of closures is supported by the closure slide 61 and may be readily pushed along the closure slide 61 into the closure support 15.

Filled containers 16 are delivered to the feed portion of the machine by means of a conveyor 62. A transverse pusher element 63 extends across one end of the conveyor 62 for moving one at a time containers 16 from the conveyor 62 into position to be moved into the vacuum closing machine. The transverse pusher 63 may be of any construction and is illustrated as being actuated by an extensible fluid motor 64. The filled, but unclosed container 16 is delivered by the pusher element 63 to what may be considered a container receiving station 65.

A feed assembly, generally identified by the numeral 66 is provided for simultaneously and sequentilly removing a closed container 16, placing a next filled container on the container support 14 and moving a closure 17 into position in the closure support 15. In order that a closed container pushed from the container support 14 may be readily handled, suitable discharge mechanism 67, such as the illustrated take-away conveyor, is provided.

The feed assembly 66 basically includes a horizontally disposed shaft which is suitably mounted for both axial reciprocatory movement and rotary movement. At the extreme forward or left end of the shaft 68 there is mounted a pusher element 69 which is disposed between the container support 14 and the container receiving station 65. The pusher element 69, in its normal position, is downwardly offset from the axis of the shaft 68 and is configurated to conform to that portion of the container 16 with which it is engaged so as to assure the direct movement of a closed container off of the container support 14 and onto the discharge or take-away mechanism.

A sleeve-like support 70 is mounted on the shaft 68 for relative rotation and is longitudinal positioned by means of a pair of collars 71. The sleeve-like support 70 projects bot above and below the shaft 66, as is clearly shown in FIG. 1 and includes an upstanding arm 72 to which a pusher element 73 is secured. The pusher element 73 is configurated for engaging and is positioned for engaging a closure 17 and moving the same along the guide track 61 into position in the closure support 15.

The tubular support 70 also includes a bottom flange 74 which, in turn, engages a support member 75 which is mounted for guided reciprocatory movement. The support element 75 carries at the left or forward face thereof a pusher element 76 which is particularly configurated for engaging a container 16 whidh has been previously filled and which is to be closed and moving the same onto the container support 14. It is to be noted that the pusher element 76 is spaced from the pusher element 69 and that the pusher elements 69 and 76 are disposed on opposite sides of the container receiving station 65.

The shaft 68 slidably passes through a shaft rotating mechanism which is generally identified by the numeral 77. The shaft rotating mechanism includes a power unit 78, which may be in the form of an electric motor, and a turning mechanism 80 which may be driven in any conventional manner by the power unit 78. The turning mechanism includes a sleeve 81 which is rotatably journalled and through which the shaft 68 freely passes, the shaft 68 being keyed to the sleeve 81 by means of a key 82 for rotation therewith.

In order to effect the reciprocatory movement of the shaft 68, an extensible fluid motor 83 is coupled to the trailing or right-hand end thereof. A rotary type coupling 84 is provided with the coupling 84 permitting the limited oscillatory movement of the shaft 68 as will be imparted thereto by returning mechanism 77 for a purpose to be described hereinafter.

It will be readily apparent from FIG. 1 that with the feed mechanism 66 in fully retracted position, a filled container 16 may be pushed by the transverse pusher 63 into the container receiving station 65 between the pusher elements 69 and 76. In a like manner, a lowermost closure 17 may be dropped down into the closure slide 61 for engagement by the pusher element 73. The fluid motor 83 is then actuated to move the shaft 68 axially to the left with the result that the pusher element 76 engages the filled container 16 to be closed and the pusher element 73 engages the closure 17 which is to be applied to that container. After a limited movement of the shaft 68 to the left, the pusher element 69 engages the closed container 16 resting upon the container support 14.

Further movement of the shaft 68 to the left results in the closed container 16 being moved off of the container support 14 onto the take-away mechanism 67. At this time the container to be closed and its associated closure now begin to engage the container support 14 and the closure support 15, respectively.

Further movement of the shaft 68 to the left results in the container 16 to be positioned on the support plate 14 and closure 17 to be positioned in the closure support 15.

Figure 6:
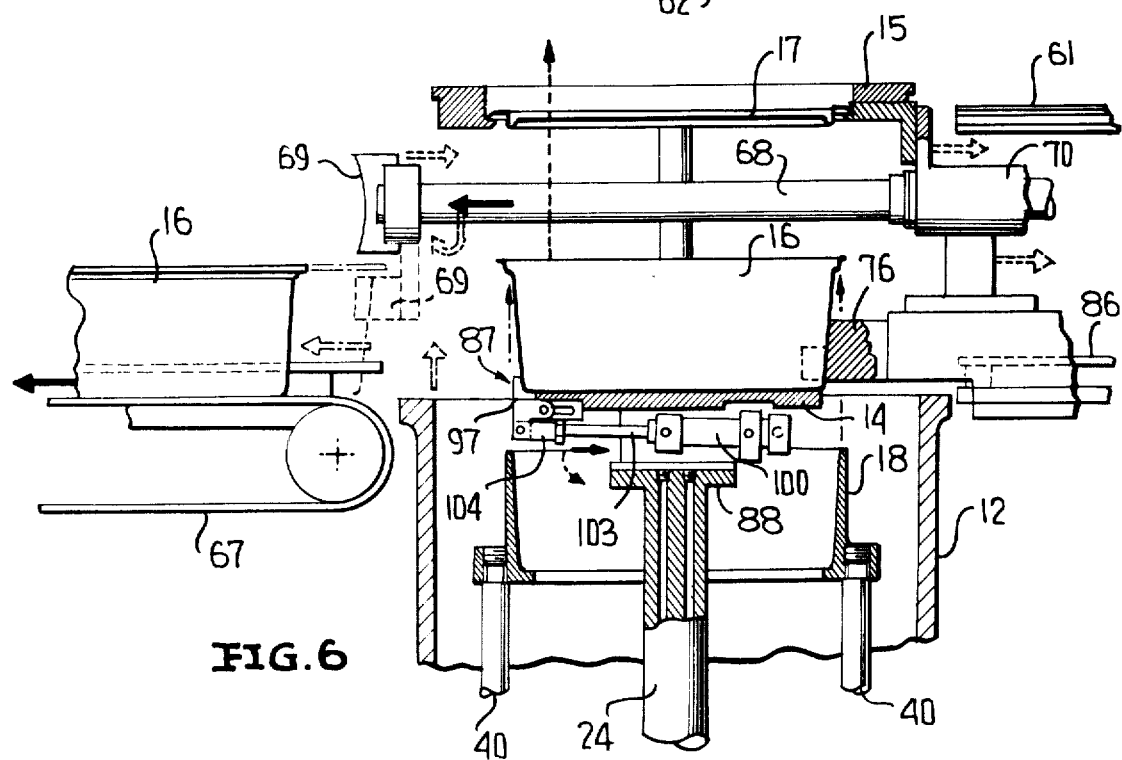
FIG. 6 is a fragmentary vertical sectional view similar to FIG. 3 and shows the manner in which a closed container is pushed from the machine and a container to be closed is positioned within the machine.

The turning mechanism 77 is now actuated to rotate the shaft 68, 90 degrees, which brings the pusher 69 to a position wheein the support part thereof is disposed substantially horizontal and is in a position to clear the newly positioned container 16, as is schematically shown in FIG. 6. The shaft 68 is now free to be retracted with the result that the fluid motor 83 is actuated to move the shaft 68 to the right to its starting position. After the shaft 68 has returned at least to the point where the pusher 69 has passed over the newly positioned container 16, it may again be rotated back to its original orientation.

The pusher elements 73 and 76 are in no way effected by the rotation or oscillation of the shaft 68. As indicated above, the sleeve member 70 permits relative rotation of the shaft 68 with respect thereto and therefore, the shaft 68 is free to rotate with respect to the sleeve member 70.

RETRACTABLE STOP

It will be readily apparent that it is necessary for the container 16 to be closed to be accurately positioned on the container support 14. While the pusher element 76 is contoured to fit that portion of the container 16 engaged thereby and suitable guide means, such as the guide rails 86 of FIGS. 2 and 6 are provided to substantially assure the alignment of the container with the support plate 14, a retractable stop 87 is provided in association with the container support 14 for cooperation with the pusher 76 to assure the proper positioning of the container 16 on the container support 14 for engagment of the container 16 by the mold 18. As is best shown in FIGS. 6, 7 and 8, the support shaft 24 is provided at the upper end thereof with a mounting flange 88. A pair of transversely spaced support members 90 are secured to the upper surface of the flange 88, in turn, are secured to the underside of the container support 14 which is in the form of a flat plate.

At the left end thereof, the underside of the container support 14 is provided with a recess 92 which is aligned with the space between the support members 90. In this recess there is seated a pair of transversely spaced, depending guide members 93 which have formed therein transversely aligned, longitudinally extending slots 94.

The stop 87 is of a generally inverted T-shaped configuration and includes a stem 95 having arms 96 and 97 projecting from opposite sides thereof. The upper end of the stem 95 is positioned between the guides 93 and has a transverse pin 98 the ends of which project transversely beyond the stem 95 and is seated in the slots 94. In this manner, the stop 87 is mounted for both pivotal and sliding movement.

With particular reference to FIG. 7, it will be seen that there is mounted between the two supports members 90 and between the mounting flange 88 and the container support 14 an extensible fluid motor 100. The fluid motor 100 including a mounting bracket 101 having pins 102 projecting therefrom and seated in the support members 90.

The fluid motor 100 also includes a piston rod 103 which is provided at the forward end thereof with a bifurcated fitting 104 which, in turn, is connected to the arm 96 of the stop 87 by means of pivot pin 105.

As is clearly shown in FIG. 7, the arm 97 of the adjustable stop 87 is of an increased transverse width. Also, as is clearly shown in FIG. 6, the arm 97 is configurated to match the lower portion of the container 16 which it is aligned with.

With particular reference to FIGS. 3 and 6, it will be seen that when the piston rod 103 is in its retracted position, the retractable stop 87 is in a retracted position fully underlying the container support 14. On the other hand, when the fluid motor 100 is actuated, and the piston rod 103 thereof is extended, the stop 87 will slide to the left, as viewed in FIG. 3, until the pin 98 reaches the ends of the slots 94, at which time, the stop 83 will pivot with the contoured arm 97 swinging from a horizontal position to an upstanding position as is illustrated in FIG. 6. In this upstanding position, the stop 87 is in position for engaging a container 16 being positioned on the container support 14 and to cooperate with the pusher element 76 to assure the alignment of the container 16 with the container support 14.

Referring once again to FIG. 3, it will be seen that the support shaft 24 is provided with fluid passages 107 and 108 extending axially therethrough. At the lower end of the support shaft 24, fluid lines 110 and 111, respectively, are connected to the passages 107 and 108.

With particular reference to FIG. 7, it will be seen that the upper end of the support shaft 24 a fitting 112 is connected to the support shaft 24 in communication with the fluid passage 107. The fitting 112 has a flexible line 113 connected thereto the line 113, in turn, being connected to the rear end of the fluid motor 100 by means of a fitting 114.

A further fitting 115, which is similar to the fitting 112 is connected to the upper portion of the support shaft 24 in communication with the fluid passage 108.

The fitting 115 has a hose 116 coupled thereto, and this hose, in turn, is connected by means of a fitting 117 to the forward end of the fluid motor 100.

From the foregoing, it will be readily apparent that notwithstanding the fact that the fluid motor 100 is positioned within the generaly confines of the vacuum pot 12, the fluid motor 100 is ready to be actuated at any desired time. In actual use, the stop 87 is retracted during the operation of the closing machine to close a container. When the feed assembly 66 is actuated, the stop 87 remains retracted until the closed container 16 is pushed off of the container support 14, at which time the control mechanism (not shown) for controlling the operation of the fluid motor 100 is actuated to move the stop 87 to its projecting operative position. Then, as the next container 16 moves onto the container support 14, the stop 87 is in position for cooperation with the pusher element 76 to position the container. After the container has been positioned on the container support, the stop 87 is retracted and it is clear for the mold 18 to ascend around the container support 14 and the adjustable stop mechanism carried thereby as is necessary to pick up the container 16.

It is to be understood that the operation of the vacuum closing machine and the feed mechanisms associated therewith may be automatic. However, no attempt has been made to illustrate the various control switches and valves for effecting the automatic operation of the closing machine.

Although only a preferred embodiment of the closing machine has been specifically illustrated and described herein, it is to be understood that minor variations may be made therein without departing from the spirit and scope of the invention, as defined by the appended claims.

I claim:

1. In combination with a support having an upper surface and a periphery, a retractable stop, means mounting said stop for movement between a retracted position beneath said upper surface and within said periphery of said support and a projecting position at one edge of said periphery and above said upper surface of said support, power means mounted beneath said support for shifting said stop between said positions, and said means mounting said retractable stop includes a pivot pin and an elongated slot connection whereby movement of said retractable stop is combined sliding and pivotal movement.

2. the combination of claim 1 wherein said power means for said retractable stop is of the straight line reciprocating movement type.

3. The combination of claim 1 wherein said support includes means defining said slot, and said pivot pin traverses said slot and moves along the length thereof.

4. The combination of claim 1 wherein said stop is part of a generally T-shaped member defined by a cross arm and a leg projecting generally medially thereof, said leg carries said pivot pin, and said pivot pin traverses and moves along the length of said slot.

5. The combination of claim 1 wherein said stop is part of a generally T-shaped member defined by a cross arm and a leg projecting generally medially thereof, said leg carries said pivot pin, said pivot pin traverses and moves along the length of said slot, and one end of said cross arm is moved from a generally horizontal position to a generally vertical position upon motion of said pivot pin along said slot.

6. The combination as defined in claim 5 wherein said leg carries said pivot pin and said pivot pin is disposed within said slot.

7. In combination with a support having an upper surface and a periphery, means for vertically reciprocating said support, a retractable stop, means mounting said stop for movement between a retracted position beneath said upper surface and within said periphery of said support and a projecting position at one edge of said periphery and above said upper surface of said support, power means mounted beneath said support for shifting said stop between said positions, and said means mounting said retractable stop includes a pivot pin and an elongated slot connection whereby movement of said retractable stop is a combined sliding and pivotal movement.

8. The combination of claim 7 wherein said support includes means defining said slot, and said pivot pin traverses said slot and moves along the length thereof.

9. The combination of claim 7 wherein said stop is part of a generally T-shaped member defined by a cross arm and a leg projecting generally medially thereof, said leg carries said pivot pin, and said pivot pin traverses and moves along the length of said slot.

10. The combination of claim 7 wherein said stop is part of a generally T-shaped member defined by a cross arm and a leg projecting generally medially thereof, said leg carries said pivot pin, said pivot pin traverses and moves along the length of said slot, and one end of said cross arm is moved from a generally horizontal position to a generally vertical position upon motion of said pivot pin along said slot.

11. The combination as defined in claim 10 wherein said leg carries said pivot pin and said pivot pin is disposed within said slot.

* * * * *